(12) United States Patent
Lieske

(10) Patent No.: US 9,143,804 B2
(45) Date of Patent: Sep. 22, 2015

(54) METHOD AND APPARATUS FOR PARALLEL H.264 IN-LOOP DE-BLOCKING FILTER IMPLEMENTATION

(75) Inventor: Hanno Lieske, Tokyo (JP)

(73) Assignee: NEC CORPORATION, Tokyo (JP)

( * ) Notice: Subject to any disclaimer, the term of this patent is extended or adjusted under 35 U.S.C. 154(b) by 800 days.

(21) Appl. No.: 13/502,916

(22) PCT Filed: Oct. 29, 2009

(86) PCT No.: PCT/JP2009/068948
§ 371 (c)(1),
(2), (4) Date: Apr. 19, 2012

(87) PCT Pub. No.: WO2011/052097
PCT Pub. Date: May 5, 2011

(65) Prior Publication Data
US 2012/0213297 A1    Aug. 23, 2012

(51) Int. Cl.
H04N 7/26 (2006.01)
H04N 19/86 (2014.01)
H04N 19/61 (2014.01)
H04N 19/82 (2014.01)
H04N 19/436 (2014.01)

(52) U.S. Cl.
CPC ............ *H04N 19/86* (2014.11); *H04N 19/436* (2014.11); *H04N 19/61* (2014.11); *H04N 19/82* (2014.11)

(58) Field of Classification Search
CPC ................ H04N 19/00781; H04N 19/00896; H04N 19/00909; H04N 19/436; H04N 19/61; H04N 19/82; H04N 19/86; H04N 7/26382; H04N 7/26755; H04N 7/26888; H04N 7/50; H04N 19/117; H04N 19/176; H04N 19/423; H04N 19/42; H04N 19/80; G06T 2207/20192

USPC ......................................... 375/240.01–240.29
See application file for complete search history.

(56) References Cited

U.S. PATENT DOCUMENTS

| | | | | |
|---|---|---|---|---|
| 6,388,711 | B1 * | 5/2002 | Han et al. | 348/441 |
| 6,738,528 | B1 * | 5/2004 | Nio et al. | 382/268 |
| 8,204,129 | B2 * | 6/2012 | He | 375/240.24 |
| 2005/0281339 | A1 * | 12/2005 | Song | 375/240.24 |

(Continued)

FOREIGN PATENT DOCUMENTS

WO    WO2008/067500 A2    6/2008

OTHER PUBLICATIONS

International Search Report in PCT/JP2009/068948 dated Mar. 3, 2010(English Translation Thereof).

(Continued)

*Primary Examiner* — Sath V Perungavoor
*Assistant Examiner* — Nathnael Aynalem
(74) *Attorney, Agent, or Firm* — McGinn IP Law Group, PLLC

(57) ABSTRACT

Compared to the related art, where the time distance in horizontal direction is 2 Synchronization Intervals (SI) between 2 Processing Units which are processing neighboring MB rows, the current invention enables to reduce the distance from 2 SIs to 1 SI, which increases the start-up phase performance. This is reached by dividing the filter task into sub tasks and reordering the execution order of these sub tasks. The sub tasks include a vertical edge filter task and a horizontal edge filter task. Further, the synchronization is scheduled in between the vertical edge filter task and the horizontal edge filter task.

8 Claims, 17 Drawing Sheets

(56) References Cited

U.S. PATENT DOCUMENTS

| | | | |
|---|---|---|---|
| 2006/0029135 | A1 | 2/2006 | Zhou et al. |
| 2006/0078052 | A1 | 4/2006 | Dang |
| 2006/0133504 | A1* | 6/2006 | Jung et al. .............. 375/240.16 |
| 2007/0291858 | A1* | 12/2007 | Hussain et al. .......... 375/240.29 |
| 2008/0159407 | A1 | 7/2008 | Yang et al. |

OTHER PUBLICATIONS

JVT, "Draft recommendation and final draft international standard of joint video specification," ITU-T Rec. H.264 and ISO/IEC 14496-10 AVC, May 2003.

L.-G. Chen, "Architecture design for deblocking filter in H.264/JVT/AVC," Proc. of Multimedia and Expo, vol. 1, pp. 693-696, Jul. 2003.

Peter List, Anthony Joch, Jani Lainema, Gisle Bjøntegaard, and Marta Karczewicz, "Adaptive Deblocking Filter", IEEE Transactions on Circuits and Systems for Video Technology, vol. 13, pp. 614-619, 2003.

T. Moriyoshi and S. Miura, "Real-time H.264 encoder with deblocking filter parallelization", In IEEE Int. Conf. on Consumer Electronics, pp. 63-64, 2008.

Zhao and P. Liang, "Data partition for wavefront parallelization of H.264 video encoder," in IEEE International Symposium on Circuits and Systems., 2006.

E. van der Tol, E. Jaspers, and R. Gelderblom, "Mapping of h.264 decoding on a multiprocessor architecture," Image and Video Communications and Processing 2003, pp. 707-718, May 2003.

C.H. Meenderinck, A. Azevedo, M. Alvarez, B.H.H. Juurlink, A. Ramirez, "Parallel Scalability of of H.264", Proceedings of the first Workshop on Programmability Issues for Multi-Core Computers, Goteborg, Sweden, Jan. 2008.

Azevedo, C.H. Meenderinck, B.H.H. Juurlink, A. Terechko, J. Hoogerbrugge, M. Alvarez, A. Ramirez, M. Valero, "Parallel H.264 Decoding on an Embedded Multicore Processor", Proceedings of Hipeac Conference, Paphos, Cyprus, Jan. 2009.

* cited by examiner

| Number of PU | Horizontal size in MB | Speed up in percentage |
|---|---|---|
| 8 | 20 | 20% |
| 16 | 20 | 30% |
| 32 | 20 | 38% |
| 64 | 20 | 43% |
| 128 | 20 | 46% |
| 256 | 20 | 48% |
| 8 | 40 | 13% |
| 16 | 40 | 21% |
| 32 | 40 | 30% |
| 64 | 40 | 38% |
| 128 | 40 | 43% |
| 256 | 40 | 46% |
| 8 | 80 | 7% |
| 16 | 80 | 13% |
| 32 | 80 | 21% |
| 64 | 80 | 30% |
| 128 | 80 | 38% |
| 256 | 80 | 43% |
| 8 | 120 | 5% |
| 16 | 120 | 10% |
| 32 | 120 | 17% |
| 64 | 120 | 25% |
| 128 | 120 | 34% |
| 256 | 120 | 40% |

Fig. 7

"Prior Art"

METHOD AND APPARATUS FOR PARALLEL H.264 IN-LOOP DE-BLOCKING FILTER IMPLEMENTATION

TECHNICAL FIELD

The present invention relates to a method and an apparatus for an in-loop de-blocking filter used in the H.264 video codec for parallel execution on a number of processing units.

BACKGROUND ART

Over the last years, H.264 (NPL 1), a standard for high efficient video compression, has been getting more and more popular and has entered many application areas such as HDTVs, portable videos, multimedia, video conferencing or video and digital cameras.

One reason for the big success is the high efficiency accompanied with high picture output quality, which is also a result of the use of the de-blocking filter (PTL 1, NPL 2, NPL 3).

The H.264 de-blocking filter 101 is a closed-loop filter which operates inside the decoding loop 108 with an inter prediction unit 103 and an intra prediction unit 105, an addition unit 107 and a selection unit 106 as well as the memory areas for the actual (102) and reference frames (104) as shown in FIG. 8, which shows a block diagram of an H.264 video decoder decoding loop.

The de-blocking filter is necessary for block-wise lossy coding at high compression ratios.

FIG. 9 shows the structure of a macro block (MB) 200 with 4 needed pixels 203 on each side of the edge 202 to implement an H.264 in-loop de-blocking filter.

Two neighboring image pixels that are coded in two different MBs or sub blocks (SB) 201 may describe the same image content.

The independent prediction and coding of the two pixels may however result in different reconstruction values on both sides of the block edge.

The de-blocking filter 101 alleviates such reconstruction differences at block boundaries adaptively according to their estimated magnitude.

Due to the fact that for the filtering at block boundaries pixels from both sides of the boundaries are needed, there exist dependencies between neighboring MBs.

As shown in FIG. 10, next to the data of the current processed macro block (MBC) 400, the last SB row 43 of the upper macro block (MBU) 403 and the last SB column 41 of the left macro block (MBL) 401 are needed to process the current macro block (MBC) 400.

There exist implementations like described in [NPL 4], which are neglecting these dependencies in a first run over the image to increase the parallelism and then correcting the errors in a second run.

However, most other implementations are running only one time over the picture and they are taking these dependencies in the first run into account.

Other implementations are decreasing the processing time by either exploiting the task level [PTL 2] [PTL 3] or data level parallelism [NPL 5, NPL 6, NPL 7, NPL 8].

In the related art [NPL 5-NPL 8], first all data necessary for processing an MB is loaded, then the MB is processed, and finally the data is stored back. This results in dependencies while concurrently processing the current macro block (MBC) 400 and the left macro block (MBL) 401, the MBC 400 and the upper macro block (MBU) 403, and the MBC 400 and the upper right macro block (MBUR) 405 as shown in FIG. 11, 12, 13 respectively.

FIG. 11 shows the necessary data when processing the MBL 401 and the MBC 400.

If processing both the MBC 400 and the MBL 401 in parallel, from MBL 401, the shaded SB column data 41 on the right side is also needed for processing the MBC 400.

FIG. 12 shows the necessary data when processing the MBU 403 and the MBC 400.

If processing both the MBU 403 and the MBC 400 in parallel, from MBU 403, the shaded lower SB row 43 is also needed for processing the MBC 400.

FIG. 13 shows the necessary data when processing MBUR 405 and the MBC 400.

Here, the shaded area 46 from MBU 403 is needed and updated in both MB filter tasks.

FIG. 14 shows the necessary data when processing MBUL 407 and the MBC 400.

Here, no same data is needed in both MB filter processes so that these MBs 407 and 400 are processable in parallel.

FIG. 15 shows a schematic block diagram of a filtering task.

A Filter apparatus 1000 includes a plurality of Macro Block filters (MB Filters) 1100, 1101, 1102.

At first, a Picture data 10 is sliced into a plurality of Macro block rows.

The Macro block rows are processed by corresponding MB filters respectively in parallel.

Meanwhile, since filtering a Macro Block requires the data from neighboring Macro Blocks as mentioned above, an inter-processor synchronization is required between the MB Filters.

FIG. 16 shows MB filter tasks in the related art.

At first the data for one MB is loaded in ST51, then processed (ST53) and finally stored back (ST55).

The Data load task (ST51) includes "Loading current MB" (ST511), "Loading left SB column" (ST512) and "Loading upper SB row" (ST513).

The Data process task (ST53) includes "Processing vertical edges" (ST531) and "Processing horizontal edges" (ST532).

The "Data store" task (ST55) includes "Storing current MB" (ST551), "Storing left SB column" (ST552) and "Storing upper SB row" (ST553).

Further, the synchronization "Inter sync" (ST57) is performed at the end of the MB processing, which is necessary, when operating for example on a multi-processor unit (MB Filter), where each MB Filter is working on an MB row and multiple MB Filters are running at the same time.

Inside an MB row, the fact that the MBs are all processed from the same MB Filter guaranties that the dependencies between MBs are observed.

Given the execution procedure of the filtering process as mentioned above, during the start-up phase, the parallelism is step-wise increased until all PU have started the filter task.

As shown in FIG. 17, before starting to process the MBC 400, processing the MBL 401, the MBU 403 and the MBUR 405 must have been finished.

The resulting delay is 2 Synchronous Intervals (SI), which correspond to 2 MBs.

CITATION LIST

Patent Literature

PTL 1: Minhua Zhou et al, "In-loop Deblocking Filter", U.S. Patent Pub. No. US20060029135.

PTL 2: Philip. P. Dang, "Method and apparatus for parallel processing of in-loop deblocking filter for H.264 video compression standard", U.S. Patent Pub. No. US20060078052.

PTL 3: Deuk-soo Jung, "Deblocking filters for performing horizontal and vertical filtering of video data simultaneously and methods of operating the same", U.S. Patent Pub. No. US20060133504.

Non Patent Literature

NPL 1: JVT, "Draft recommendation and final draft international standard of joint video specification," ITU-T Rec. H.264 and ISO/IEC 14496-10 AVC, May 2003.

NPL 2: L.- G. Chen, "Architecture design for deblocking filter in H.264/JVT/AVC," Proc. of Multimedia and Expo, vol. 1, pp. 693-696, July 2003.

NPL 3: Peter List, Anthony Joch, Jani Lainema, Gisle Bjøntegaard, and Marta Karczewicz, "Adaptive Deblocking Filter", IEEE Transactions on Circuits and Systems for Video Technology, Vol. 13, pp. 614-619, 2003.

NPL 4: T. Moriyoshi and S. Miura, "Real-time H.264 encoder with deblocking filter parallelization", In IEEE Int. Conf. on Consumer Electronics, pages 63-64, 2008.

NPL 5: Z. Zhao and P. Liang, "Data partition for wavefront parallelization of H.264 video encoder," in IEEE International Symposium on Circuits and Systems., 2006.

NPL 6: E. van der Tol, E. Jaspers, and R. Gelderblom, "Mapping of h.264 decoding on a multiprocessor architecture," Image and Video Communications and Processing 2003, pp. 707-718, May 2003.

NPL 7: C. H. Meenderinck, A. Azevedo, M. Alvarez, B. H. H. Juurlink, A. Ramirez, "Parallel Scalability of H.264", Proceedings of the first Workshop on Programmability Issues for Multi-Core Computers, Goteborg, Sweden, January 2008.

NPL 8: Azevedo, C. H. Meenderinck, B. H. H. Juurlink, A. Terechko, J. Hoogerbrugge, M. Alvarez, A. Ramirez, M. Valero, Parallel H.264 Decoding on an Embedded Multicore Processor, Proceedings of Hipeac Conference, Paphos, Cyprus, January 2009.

SUMMARY OF INVENTION

Technical Problem

During the start-up phase, the PUs (MB Filters) are starting the MB row processing successively with a distance of 2 SIs in the horizontal direction to each other, which leads to an overall performance decrease.

Solution to Problem

Compared to the related art, where the time distance in the horizontal direction is 2 SIs between 2 Processing Units which are processing neighboring MB rows, the current invention enables the distance to be reduced from 2 SIs to 1 SI, which increases the start-up phase performance.

The optimization is done by changing the sub task order in such a way that data dependencies between concurrently processable SIs from neighboring MB rows are reduced.

This is reached by dividing the filter task into sub tasks and reordering the execution order of these sub tasks.

The sub tasks include a vertical edge filter task and a horizontal edge filter task.

Therefore, both edge filter processing tasks are separated and surrounded by necessary data transfer tasks.

Further, the synchronization is scheduled in between the vertical edge filter task and the horizontal edge filter task.

Due to the chosen synchronization task placement, macro block dependencies can be eliminated which results in a shorter execution time of the startup phase.

Advantageous Effects of Invention

The time distance between 2 PUs (MB Filters) which are processing neighboring MB rows can be reduced from 2 SIs to 1 SI which increases the start-up phase performance.

BRIEF DESCRIPTION OF DRAWINGS

FIG. 7 shows Speed up of an exemplary embodiment in comparison to the related art;

DESCRIPTION OF EMBODIMENTS

Figure 15:
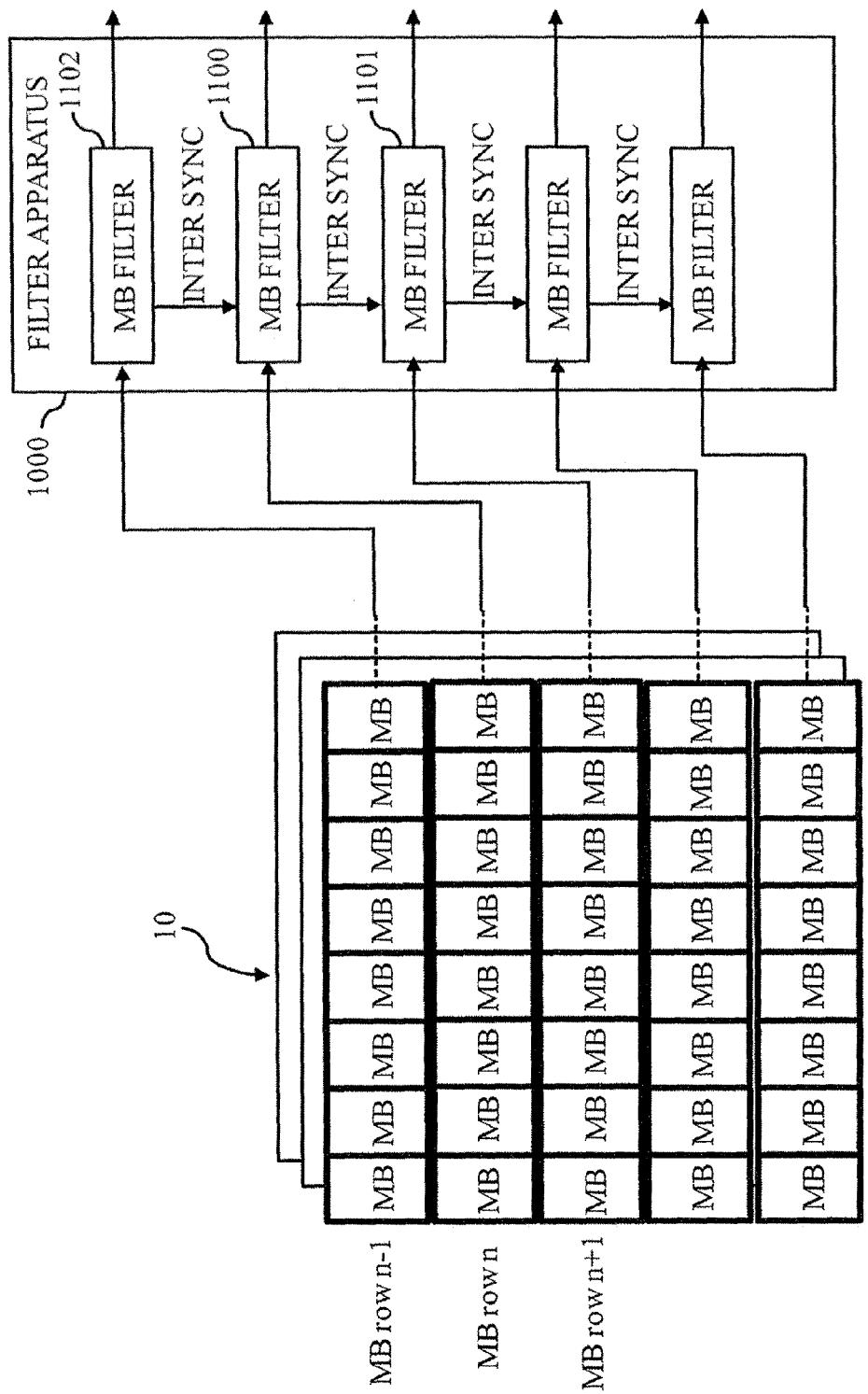
FIG. 15 is a block diagram In-loop de-blocking filter apparatus.
Figure 16:
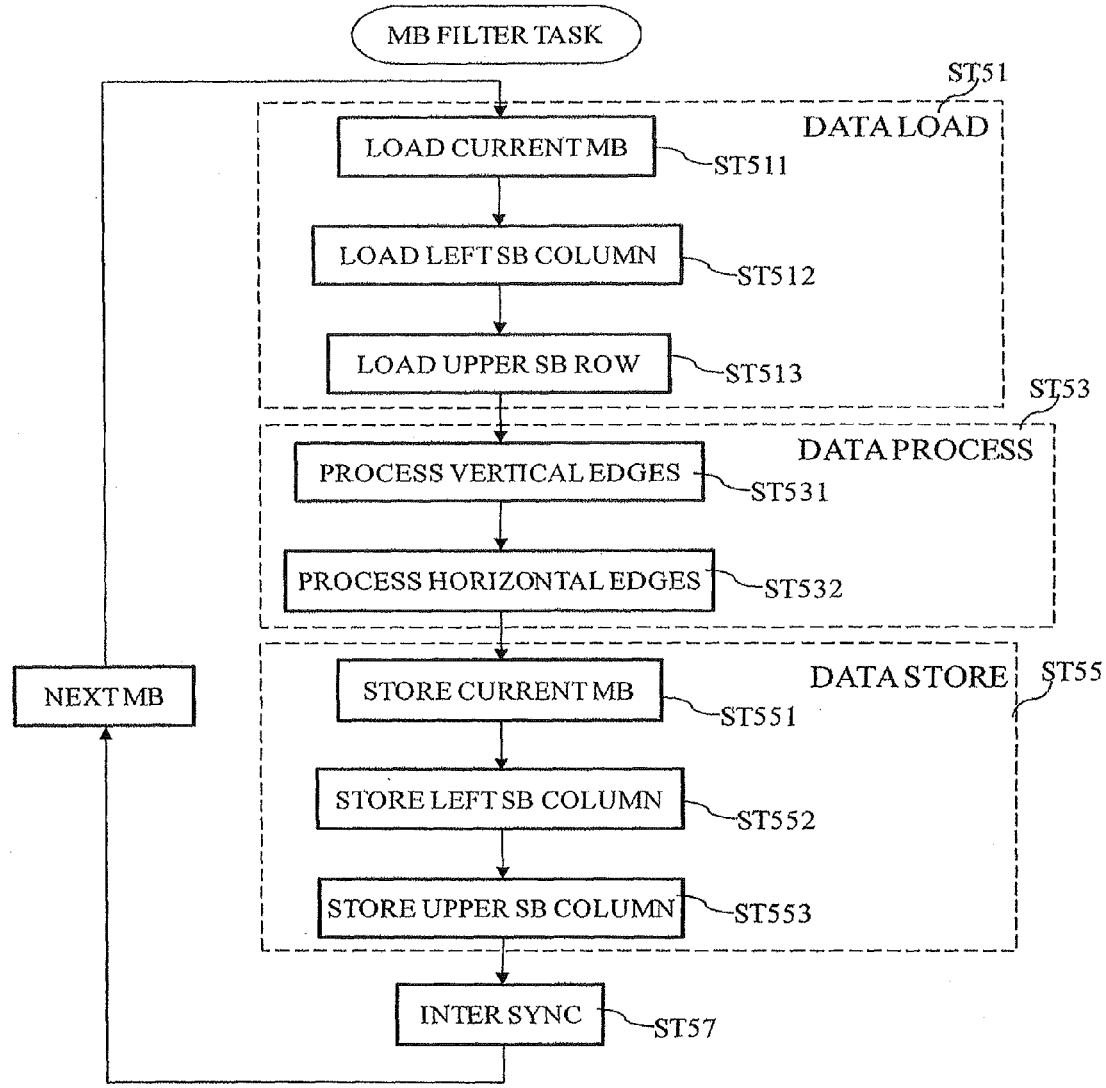
FIG. 16 shows the related art sub task order.
Figure 17:
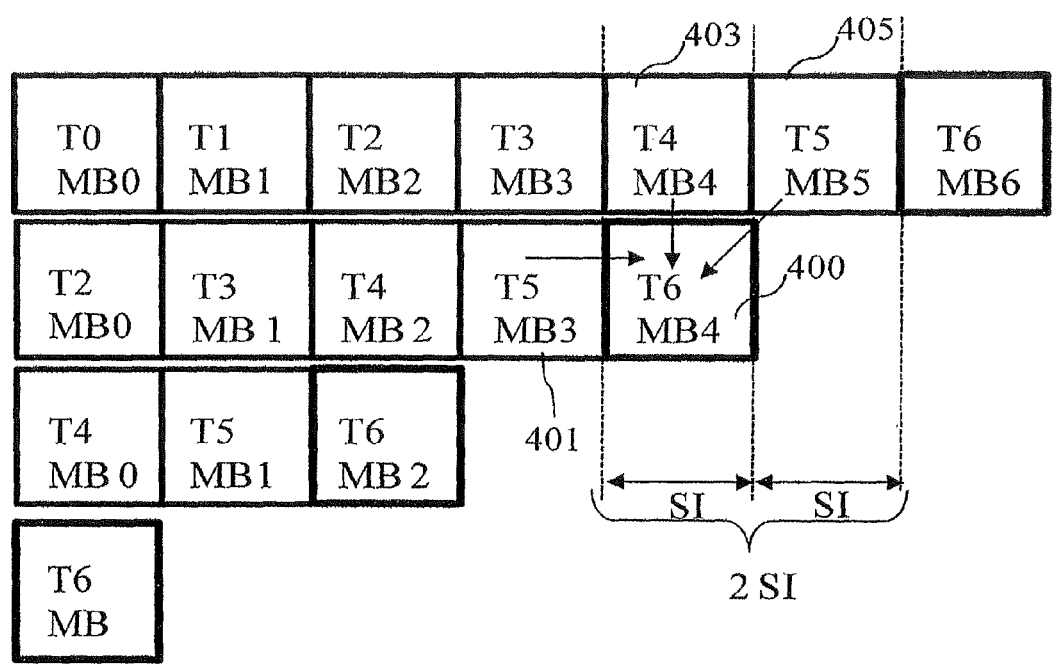
FIG. 17 shows a task dependency of neighboring macro blocks and synchronization intervals of the related art.

As shown in FIG. 15, an In-loop de-blocking filter apparatus 1000 includes a plurality of Processing Units each of which works on an MB row.

The synchronization between different Processing Units (MB Filters) is implemented by connecting the control signals responsible for the synchronization with each other.

Here, the output ctrl signal (Inter Sync) of the current MB Filter 1100 is connected to the input ctrl signal of the successor 1101.

The input ctrl signal of the current MB Filter is connected to the output ctrl signal of the predecessor 1102.

While the current MB Filter 1100 is processing MB row n, the predecessor 1102 is processing MB row n−1 and the successor 1101 is processing MB row n+1.

Figure 1:
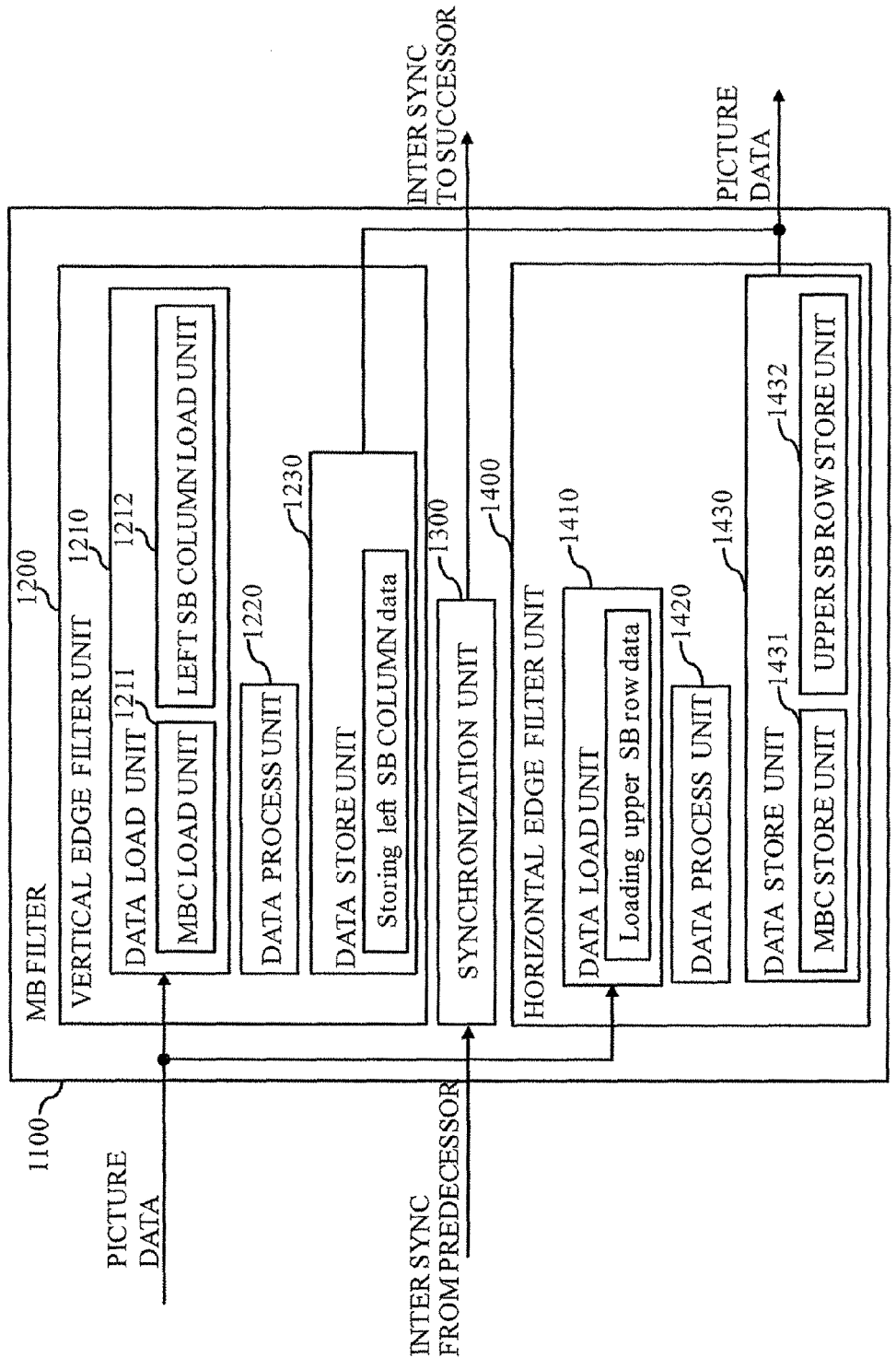
FIG. 1 is a block diagram of MB filter of an exemplary embodiment.

FIG. 1 shows a configuration of the MB Filter 1100.

The MB Filter 1100 includes a Vertical edge filter unit 1200, a Synchronizing unit 1300, and a Horizontal edge filter unit 1400.

The Vertical edge filter unit 1200 includes a Data load unit 1210, a Data process unit 1220 and a Data store unit 1230.

The Data load unit 1210 loads a necessary data for processing the vertical edges of the current MB 400.

The Data load unit includes an MBC Load unit 1211 and a Left SB column load unit 1212.

The MBC Load unit 1211 loads the current MB data 400.

The Left SB column load unit 1212 loads the last SB column 41 of an MB on the left side 401.

The Data process unit 1220 performs the filter task on the vertical edges of the current MB 400.

Data store unit 1230 stores the last SB column 41 of the MB on the left side 401.

The Synchronizing unit 1300 sends a continue signal (Inter Sync) to the successor 1101 and receives the continue signal (Inter Sync) from the predecessor 1102.

The Horizontal edge filter unit 1400 includes a Data load unit 1410, a Data process unit 1420 and a Data store unit 1430.

The Data load unit 1410 loads the last sub block row 43 of an MB on the upper side 403.

The Data process unit 1420 performs the filter task on the horizontal edges of the current MB 400.

The Data store unit 1430 includes an MBC store unit 1431 and an upper SB row store unit 1432.

The MBC store unit 1431 stores the current MB data 400.

The upper SB row store unit 1432 stores the last SB row 43 of an MB on the upper side 403.

Figure 2:
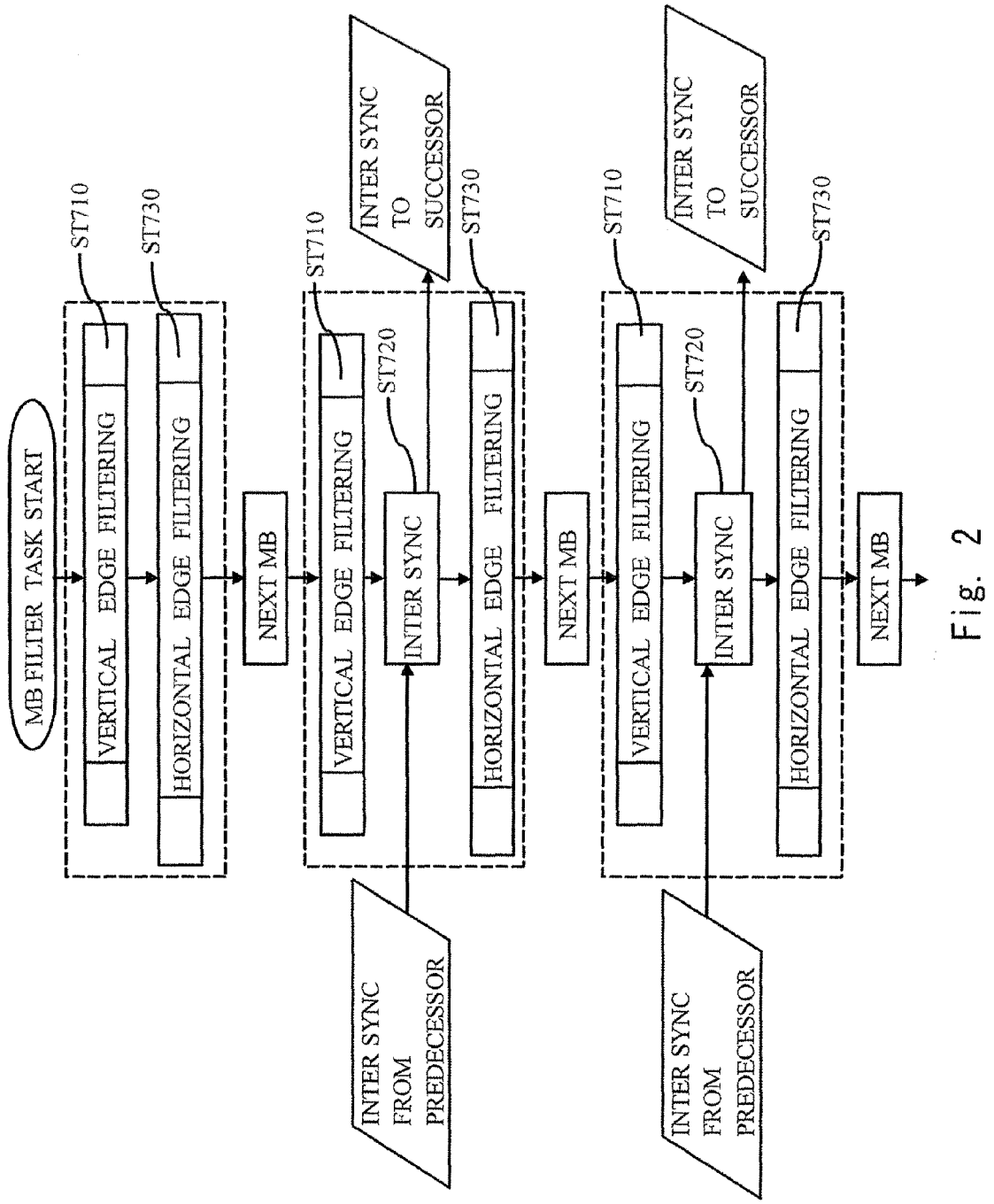
FIG. 2 is a flow of an MB filter Task of an exemplary embodiment.

FIG. 2 is a flow of the MB filter task.

In this exemplary embodiment, the MB filter task is subdivided into the two tasks; a Vertical edge filtering (ST710) and a Horizontal edge filtering (ST730).

Further, the synchronization time point for the inter synchronization (ST720) is changed.

The synchronization "Inter sync" (ST720) is now placed in between the two tasks "Vertical edge filtering" (ST710) and "Horizontal edge filtering" (ST730).

Figure 3:
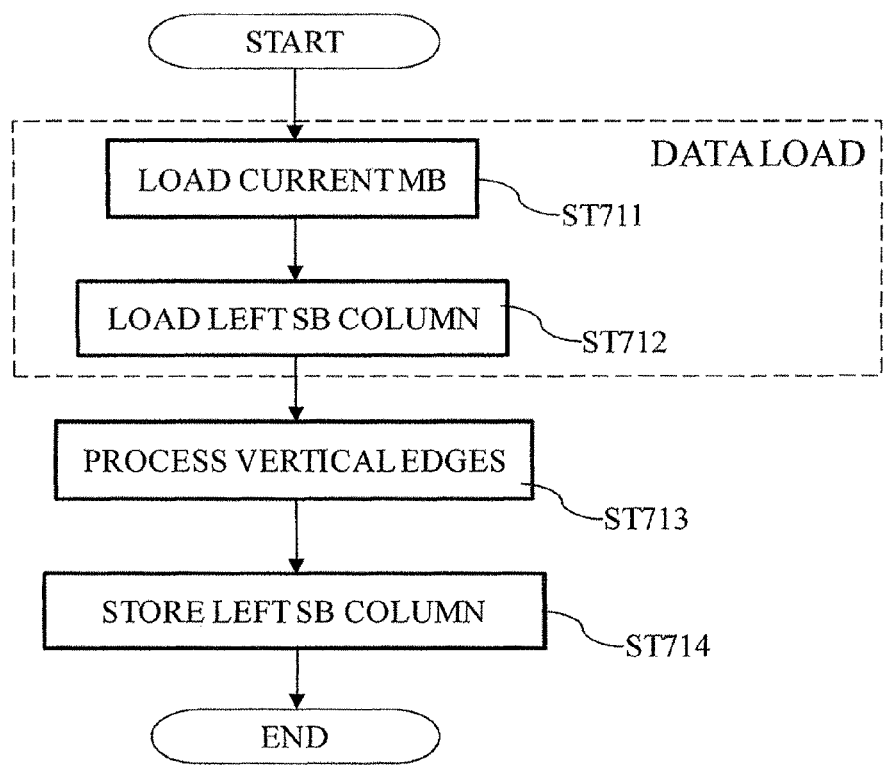
FIG. 3 is a flow of a Vertical edge filter task of an exemplary embodiment.

FIG. 3 is a flow of the vertical edge filtering.

Before filtering the vertical edges (ST713), the sub tasks "Loading current MB (ST711)" and "Loading left SB column" (ST712) are processed.

After processing this filter operation (ST713), the sub task "Storing left SB column" (ST714) is performed.

After the Vertical edge filtering (ST710), the synchronization "Inter sync" (ST720) is executed.

That is, the current MB Filter 1100 outputs a Successor control signal (Inter Sync) to the successor 1101 and receives the control signal (Inter Sync) from the predecessor 1102.

When the current MB Filter 1100 receives the control signal (Inter Sync) from the predecessor 1102, the current MB Filter 1100 starts the process of the horizontal edge filtering (ST730).

In the same manner, when the current MB Filter 1100 outputs a Successor control signal (Inter Sync) to the successor 1101, the successor 1101 starts the process of the horizontal edge filtering (ST730).

Figure 4:
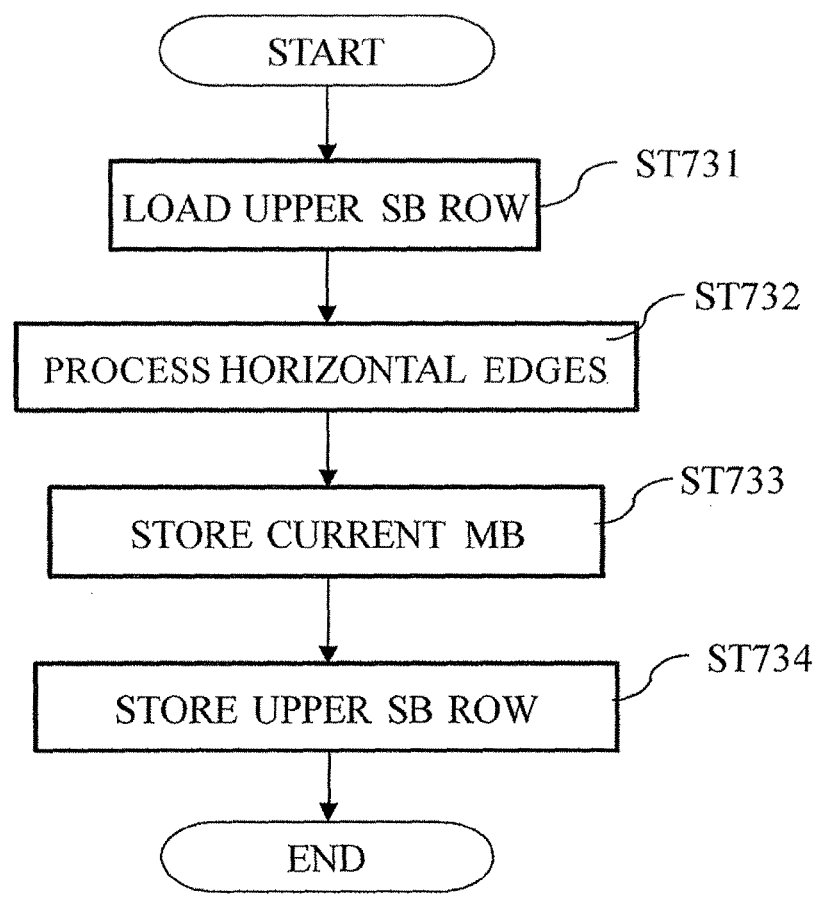
FIG. 4 is a flow of a Horizontal edge filter task of an exemplary embodiment.

FIG. 4 is a flow of the horizontal edge filtering.

Before filtering the horizontal edges (ST732), the sub task "Load upper SB row" (ST731) is performed.

Now that the Vertical edge filtering is completed, the upper SB row data is independent of the Upper right MB data 405.

After processing this filter operation (ST732), the sub tasks "Store current MB" (ST733) and "Store upper SB row" (ST734) are performed.

Next, the effects of this exemplary embodiment will be described.

In this exemplary embodiment, the filter task is divided into the two tasks "Vertical edge filtering" (ST710) and "Horizontal edge filtering" (ST730), and the execution results of these sub tasks is stored.

Further, the synchronization is set in between the Vertical edge filtering (ST710) and the Horizontal edge filtering (ST730).

Figure 5:
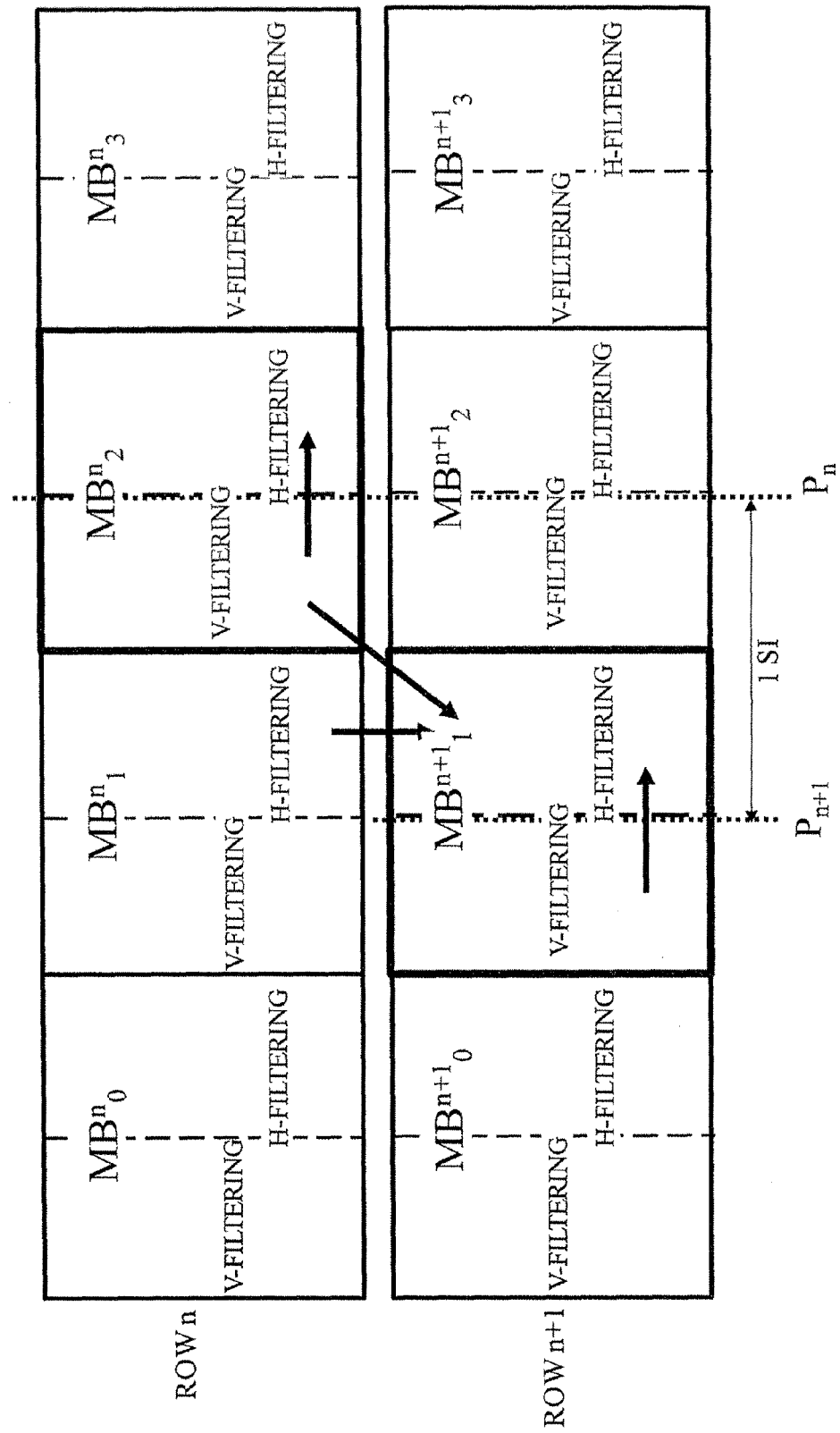
FIG. 5 shows task dependencies between neighboring synchronization intervals of an exemplary embodiment.

In FIG. 5, note $MB^n{}_2$ in the Row n and $MB^{n+1}{}_1$ in the Row n+1.

In the Row n, the horizontal edge filtering (H-Filtering) of $MB^n{}_2$ is executed after the Vertical edge filtering (V-Filtering) of $MB^n{}_2$.

This time point is represented by the Sync Point $P_n$.

And in the Row n+1, the horizontal edge filtering (H-Filtering) of $MB^{n+1}{}_1$ is executed after the Vertical edge filtering (V-Filtering) of $MB^{n+1}{}_1$.

This time point is represented by the Sync Point $P_{n+1}$.

As shown in FIG. 5, the time distance between the Sync Point $P_n$ and Sync Point $P_{n+1}$ is only one Synchronization interval which corresponds one macro block.

Further, it is shown that the Synchronization Interval and the MB process are now out of phase.

Figure 6:
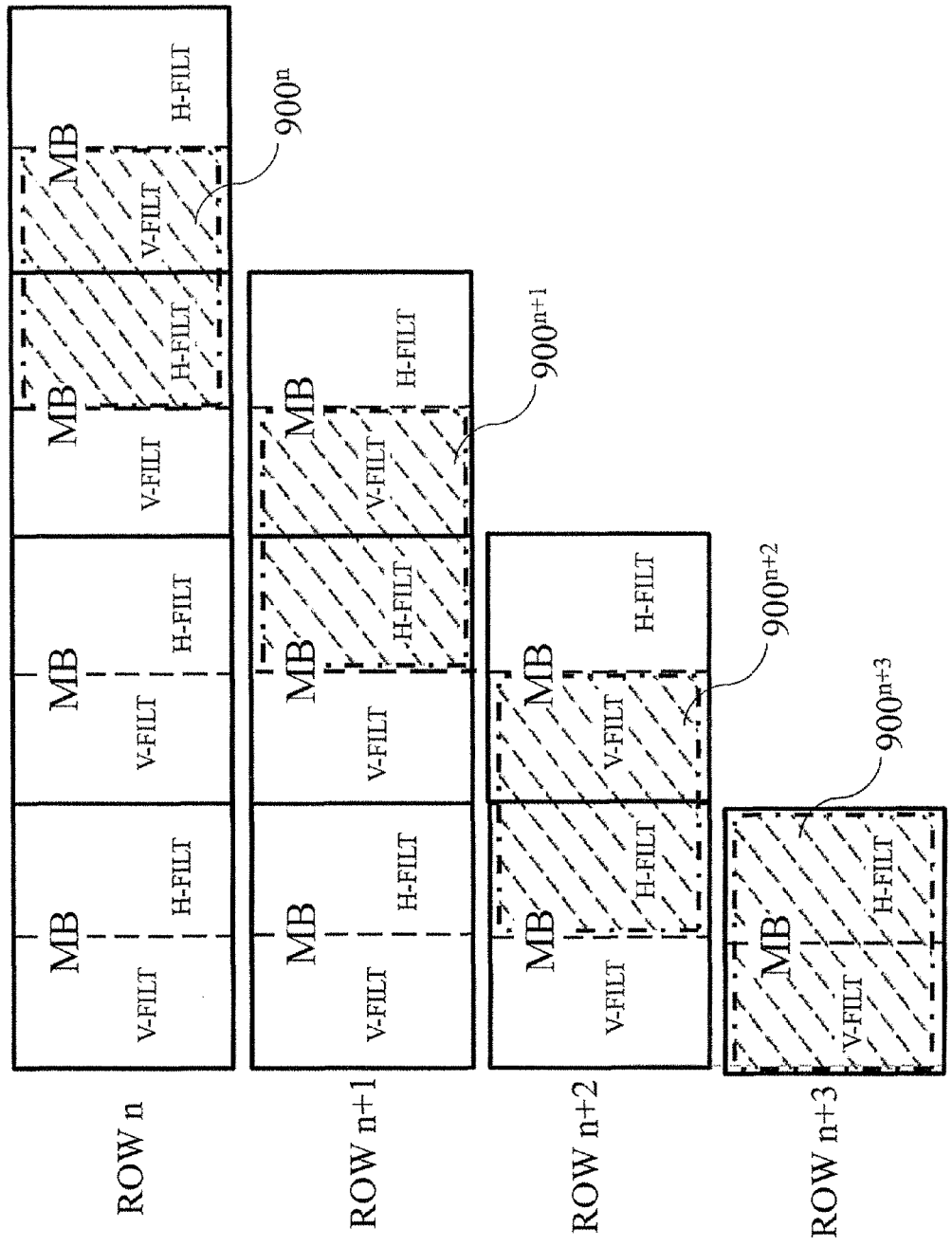
FIG. 6 shows the delay in the start-up phase of an exemplary embodiment.
Figure 8:
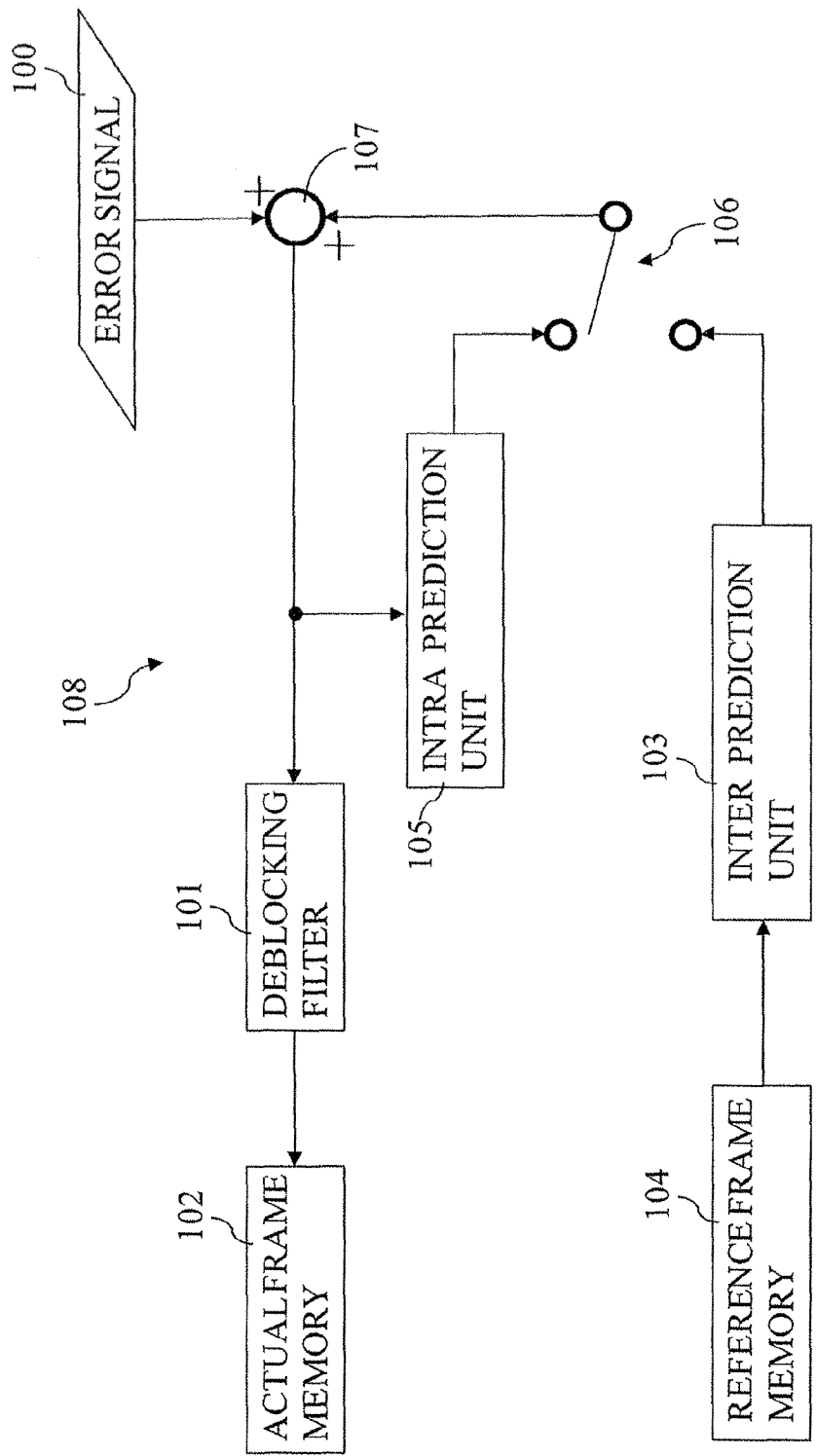
FIG. 8 is a block diagram of an H.264 video decoding loop.
Figure 9:
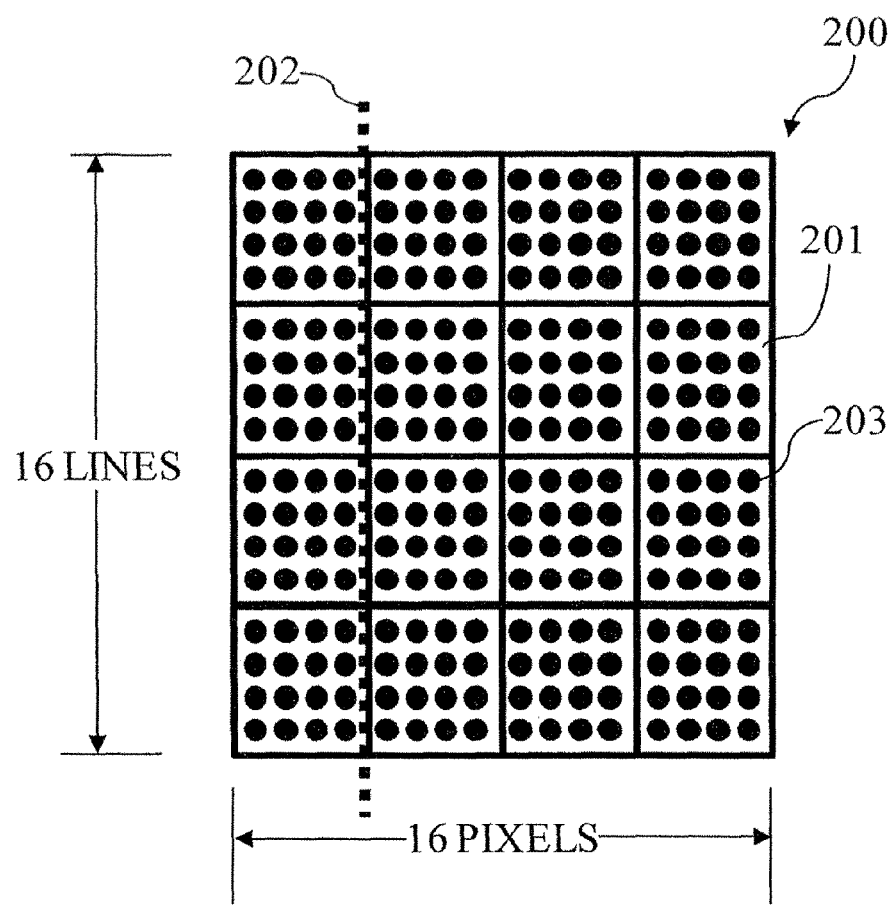
FIG. 9 shows the macro block structure.
Figure 10:
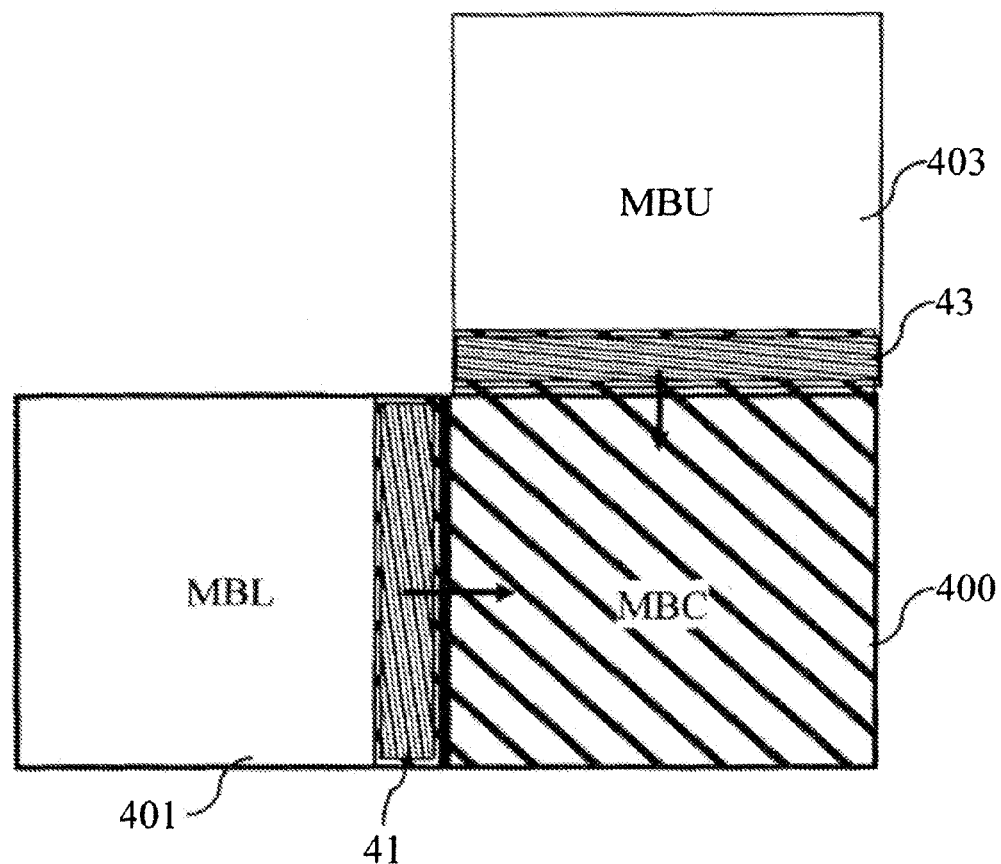
FIG. 10 shows the data needed to filter one macro block.
Figure 11:
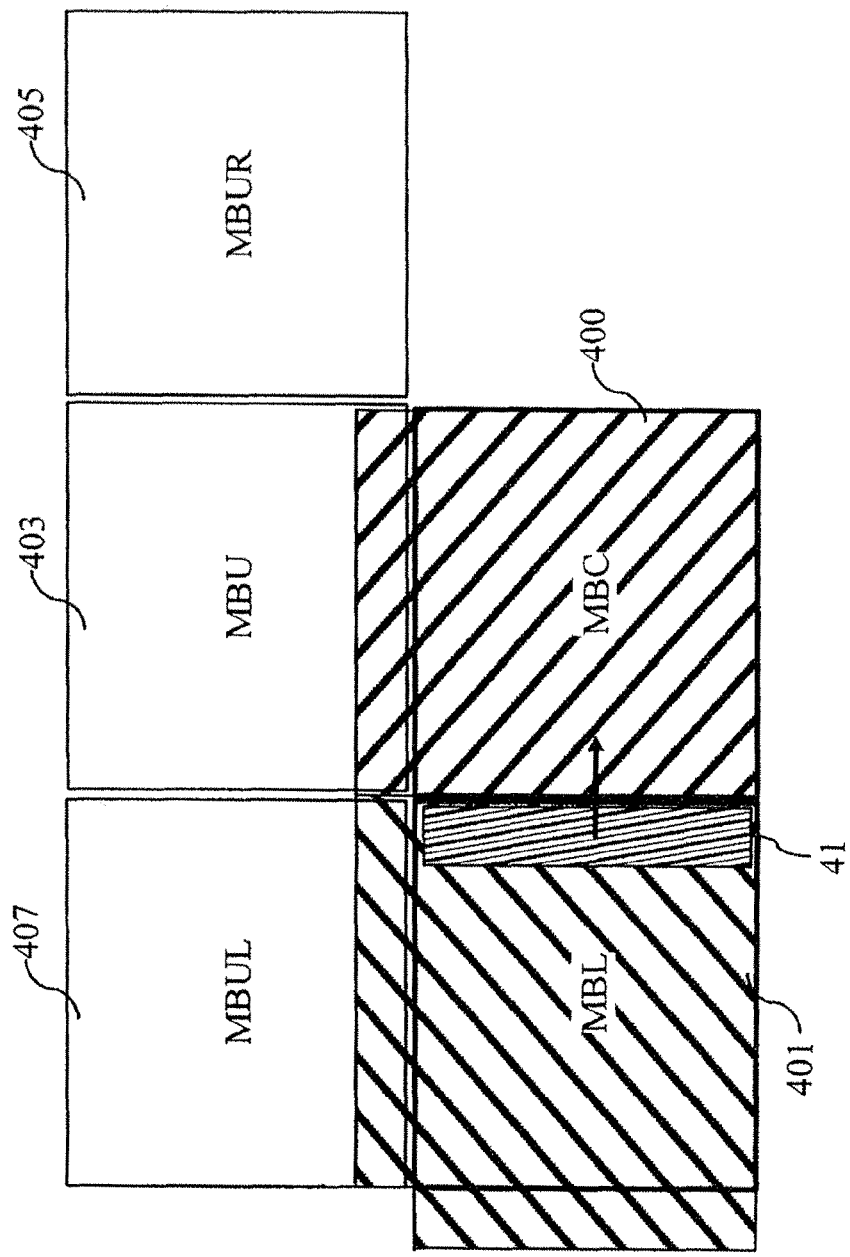
FIG. 11 shows the data needed to filter one macro block.
Figure 12:
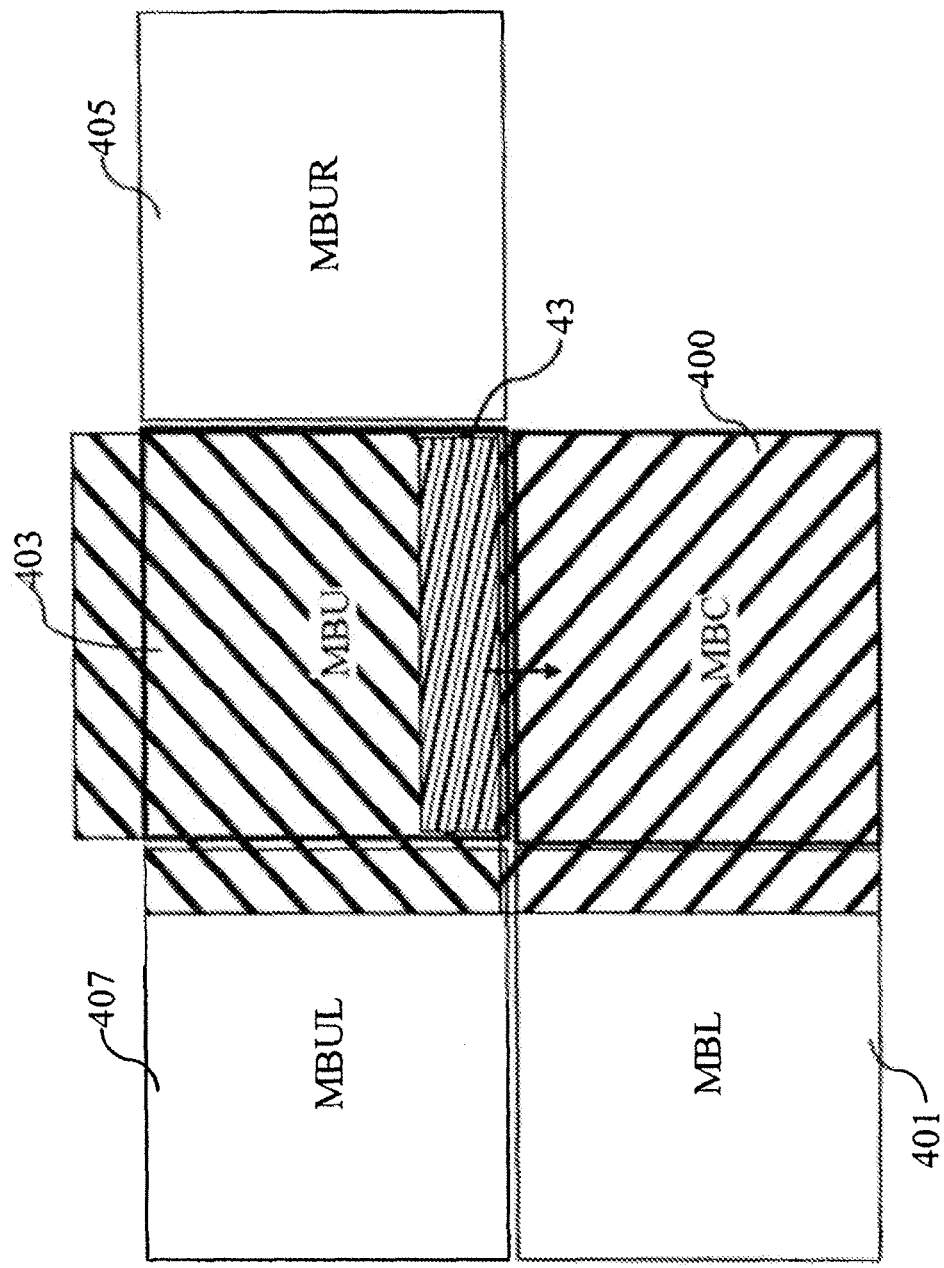
FIG. 12 shows the data needed to filter one macro block.
Figure 13:
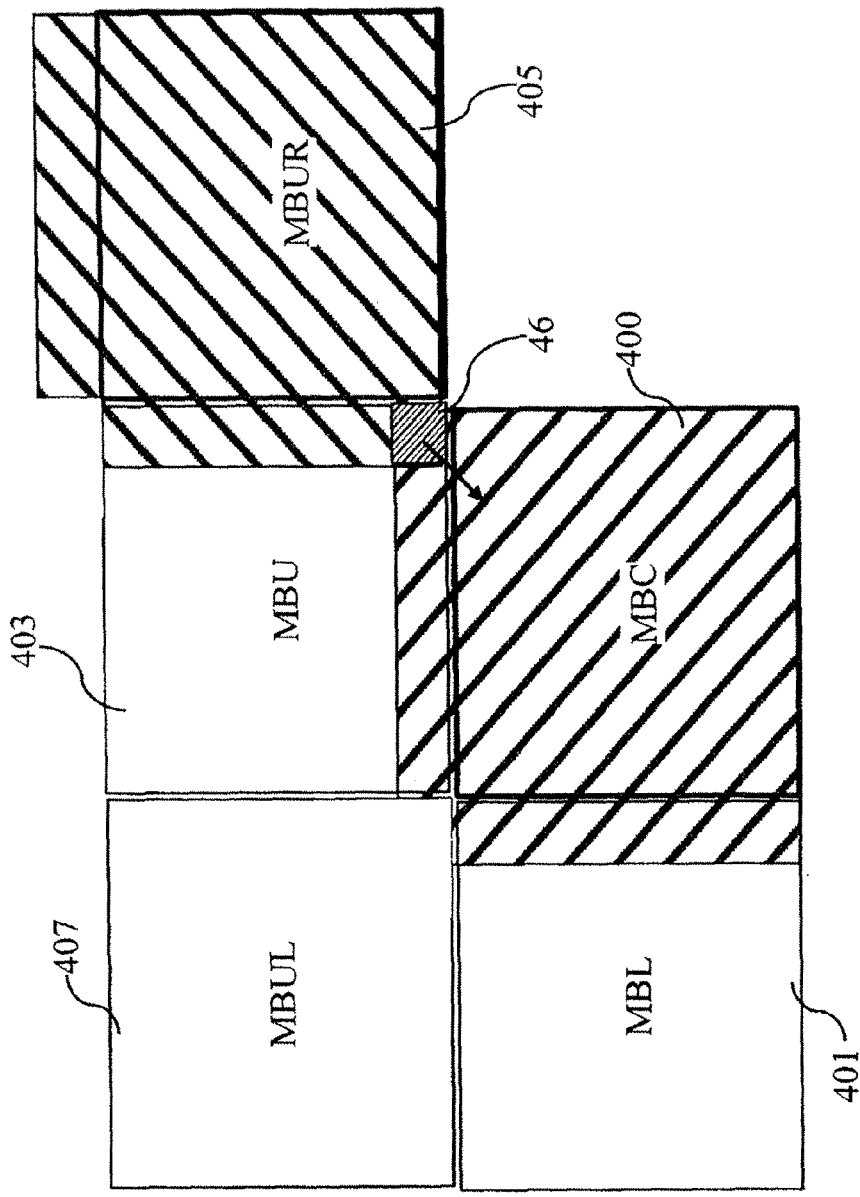
FIG. 13 shows the data needed to filter one macro block.
Figure 14:
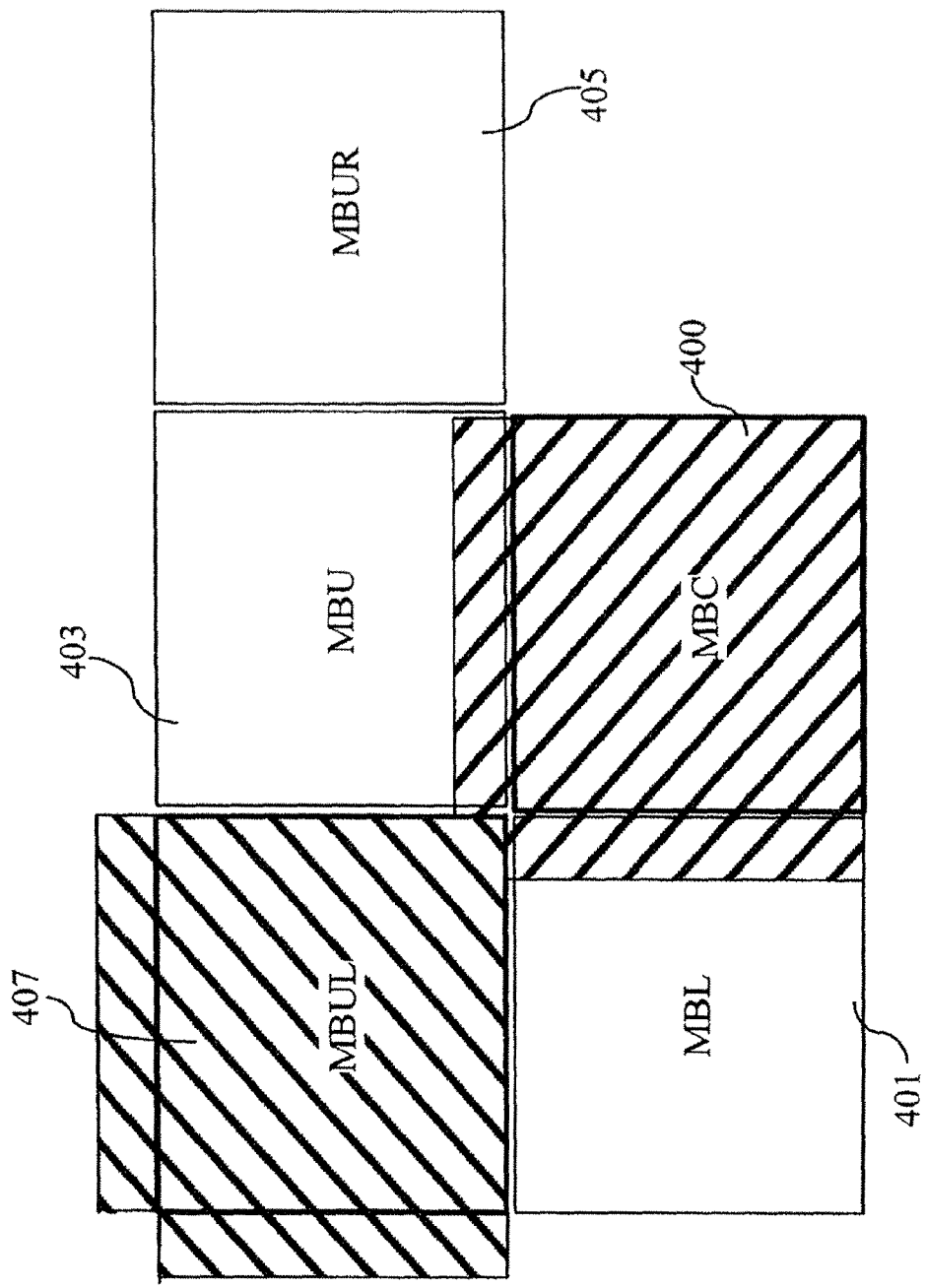
FIG. 14 shows the data needed to filter one macro block.

The resulting delay of the startup phase is shown in FIG. 6.

The dependency between the current SI ($900^{n+1}$) of the current MB row n+1 and the upper right SIUR ($900^n$) of the MB row n can be eliminated.

As can be seen, the distance between concurrently processable SIs (900) of the processed MB rows has been reduced from 2 SIs to 1 SI in the horizontal direction, which enables the MB filtering to be started faster and leads therefore to an overall performance increase compared to the related art.

FIG. 7 shows other cases with different number of MB filters and different horizontal image sizes (sizehor) in MB.

For this estimation, it is assumed that the vertical image size in MB is a multiple of the number of MB filters.

The resulting performance speedup S is between 5% and 48% for the examined cases and can be calculated by formula (1).

For large number of MB filters in which the horizontal size in MB can be neglected, this results in a maximal reachable speedup S of 50%.

$$S = 1 - \frac{\{sizehor + (N_{MBFILT} - 1)\}}{\{sizehor + 2 \times (N_{MBFILT} - 1)\}} \qquad (1)$$

Where, sizehor stands for horizontal image size in MB and $N_{MBFILT}$ stands for the number of MB filters.

This exemplary embodiment can be used to achieve an increase in the start-up phase performance by reducing the time distance in the horizontal direction between 2 MB filters which are processing neighboring MB rows from 2 SIs to 1 SI.

The optimization is reached by changing the sub task order in such a way that the task dependencies between neighboring synchronization intervals are reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to a method and an apparatus for an in-loop de-blocking filter used in the H.264 video codec.

REFERENCE SIGNS LIST

100 Error signal,
101 an in-loop de-blocking filter,

102 Actual frame buffer,
103 Inter prediction unit,
104 Reference frame buffer,
105 Intra prediction unit,
106 Selection unit,
107 Addition unit,
108 Decoding loop,
200 Macro block (MB),
201 Sub block (SB),
202 Edge,
203 pixel,
400 Current MB,
401 the left macro block (MBL),
403 the upper macro block (MBU),
405 the upper right macro block (MBUR),
407 the Upper left Macro block (MBUL),
41 Left SB column data,
43 Upper SB row data,
46 Overlapping area when processing the current MB and the upper left side at the same time,
1000 Filter apparatus,
1100, 1101, 1102 Macro Block filters (MB Filter),
1200 Vertical edge filter unit,
1210 Data load unit,
1211 MBC Load unit,
1212 Left SB column load unit,
1220 Data process unit,
1230 Data store unit,
1300 The Synchronizing unit,
1400 Horizontal edge filter unit,
1410 Data load unit,
1420 Data process unit,
1430 Data store unit,
1431 MBC store unit,
1432 upper SB row store unit,
900 concurrently processable SI.

The invention claimed is:

1. A method to implement an in-loop de-blocking filter in the H.264 video codec comprising:
preforming a vertical edge filtering process on vertical edges of a current macro block;
performing a horizontal edge filtering process on horizontal edges of the current macro block; and
outputting an inter synchronization control signal to a successor processing unit and receiving an inter synchronization control signal from a predecessor processing unit, wherein a current processing unit processes a current Macro block row n, the predecessor processing unit processes a last Macro Block row n−1, and the successor processing unit processes a Macro Block row n+1,
outputting the inter synchronization control signal to the successor processing unit after the vertical edge filtering is executed and receiving the inter synchronization control signal from the predecessor processing unit before the horizontal edge filtering is started.

2. The method to implement an in-loop de-blocking filter in the H.264 video codec according to claim 1,
wherein the vertical edge filtering comprising:
loading current Macro Block data;
loading a left Sub Block column;
processing the vertical edges of the current macro block; and
storing left Sub Block column data.

3. The method to implement an in-loop de-blocking filter in the H.264 video codec according to claim 1,
wherein the horizontal edge filtering comprising:
loading upper Sub Block row data;
processing the horizontal edges of the current macro block;
storing the current Macro Block data; and
storing the upper Sub Block row data.

4. An apparatus that performs an in-loop de-blocking filter in the H.264 video codec, comprising:
a vertical edge filtering unit that processes vertical edges of a current macro block;
a horizontal edge filtering unit that processes horizontal edges of the current macro block; and
a synchronization unit that outputs an inter synchronization control signal to a successor processing unit and receives an inter synchronization control signal from a predecessor processing unit, wherein a current processing unit processes a current Macro block row n, the predecessor processing unit processes a last Macro Block row n−1, and the successor processing unit processes a Macro Block row n+1,
the synchronization unit outputs the inter synchronization control signal to the successor processing unit after vertical edge filtering is executed and receives the inter synchronization control signal from the predecessor processing unit before horizontal edge filtering is started.

5. The apparatus that performs an in-loop de-blocking filter in the H.264 video codec according to claim 4,
wherein the vertical edge filtering unit comprising:
a current Macro Block load unit that loads current Macro Block data;
a left Sub Block column load unit that loads left Sub Block column data;
a data process unit that processes the vertical edges of the current macro block; and
a data store unit that stores the left Sub Block column data.

6. The apparatus that performs an in-loop de-blocking filter in the H.264 video codec according to claim 4,
wherein the horizontal edge filtering unit comprising:
a data load unit that loads upper Sub Block row data;
a data process unit that processes the horizontal edges of the current macro block;
a current Macro Block store unit that stores the current Macro Block data; and
a upper Sub Block row store unit that stores the upper Sub Block row data.

7. The method to implement an in-loop de-blocking filter in the H.264 video codec according to claim 2,
wherein the horizontal edge filtering comprising:
loading upper Sub Block row data;
processing the horizontal edges of the current macro block;
storing the current Macro Block data; and
storing the upper Sub Block row data.

8. The apparatus that performs an in-loop de-blocking filter in the H.264 video codec according to claim 5,
wherein the horizontal edge filtering unit comprising:
a data load unit that loads upper Sub Block row data;
a data process unit that processes the horizontal edges of the current macro block;
a current Macro Block store unit that stores the current Macro Block data; and
a upper Sub Block row store unit that stores the upper Sub Block row data.

* * * * *